(12) United States Patent
Lopez Hernandez et al.

(10) Patent No.: US 10,911,218 B2
(45) Date of Patent: Feb. 2, 2021

(54) LIGHTWEIGHT BLOCK CIPHER

(71) Applicants: LG ELECTRONICS INC., Seoul (KR); UNICAMP, Campinas/San Paulo (BR)

(72) Inventors: Julio Cesar Lopez Hernandez, Campinas (BR); Tiago Bruno Silva Dos Reis, Campinas (BR)

(73) Assignees: LG ELECTRONICS INC., Seoul (KR); UNICAMP, Campinas/San Paulo (BR)

( * ) Notice: Subject to any disclaimer, the term of this patent is extended or adjusted under 35 U.S.C. 154(b) by 107 days.

(21) Appl. No.: 16/340,278

(22) PCT Filed: Sep. 29, 2017

(86) PCT No.: PCT/KR2017/011040
§ 371 (c)(1),
(2) Date: Apr. 8, 2019

(87) PCT Pub. No.: WO2018/066951
PCT Pub. Date: Apr. 12, 2018

(65) Prior Publication Data
US 2020/0044821 A1     Feb. 6, 2020

Related U.S. Application Data

(60) Provisional application No. 62/405,975, filed on Oct. 9, 2016.

(51) Int. Cl.
*H04L 29/06* (2006.01)
*H04L 9/06* (2006.01)
(Continued)

(52) U.S. Cl.
CPC ............ *H04L 9/0631* (2013.01); *H04L 9/005* (2013.01); *H04L 9/0825* (2013.01); *H04L 9/14* (2013.01); *H04L 2209/24* (2013.01)

(58) Field of Classification Search
CPC ..... H04L 9/0631; H04L 9/005; H04L 9/0825; H04L 9/14; H04L 2209/24
See application file for complete search history.

(56) References Cited

U.S. PATENT DOCUMENTS 5,740,249 A * 4/1998 Shimizu ................ H04L 9/0625
380/28
6,243,470 B1 * 6/2001 Coppersmith ........ H04L 9/0625
380/259

(Continued)

OTHER PUBLICATIONS

Sparrow et al., "A novel block cipher design paradigm for secured communication", 2016 Annual IEEE Systems Conference (SysCon), Date of Conference: Apr. 18-21 (Year: 2016).*

(Continued)

*Primary Examiner* — Morshed Mehedi
(74) *Attorney, Agent, or Firm* — Lee, Hong, Degerman, Kang & Waimey

(57) ABSTRACT

A method for encrypting data with a provided key. The method includes generating a plurality of keys; processing the data in a plurality of rounds, with each round including: performing a first logical combination of the data with a first key; first permuting the first logically combined data based on a first defined permutation; performing a first substitution on the first permuted data; second permuting the first substituted data based on a second defined permutation; performing a second logical combination of the second permuted data with a permuted second key; and performing a second substitution on the second logically combined data. Further, performing a penultimate logical combination of the second substituted data with a penultimate key, permuting the penultimate logically combined data, performing a final substitution of the permuted data, and performing a final logical combination of the final substituted data with a last key.

21 Claims, 7 Drawing Sheets

(51) Int. Cl.
*H04L 9/00* (2006.01)
*H04L 9/08* (2006.01)
*H04L 9/14* (2006.01)

(56) References Cited

U.S. PATENT DOCUMENTS

| | | | |
|---|---|---|---|
| 7,639,797 B2* | 12/2009 | Lee | H04L 9/0631 380/28 |
| 10,146,701 B2* | 12/2018 | Hars | G06F 12/1408 |
| 10,425,226 B2* | 9/2019 | Shibutani | G09C 1/00 |
| 2002/0051534 A1 | 5/2002 | Matchett et al. | |
| 2005/0213756 A1 | 9/2005 | Hubert | |
| 2009/0214024 A1* | 8/2009 | Schneider | H04L 9/0625 380/28 |
| 2009/0245510 A1 | 10/2009 | Ciet et al. | |
| 2012/0159186 A1* | 6/2012 | Farrugia | H04L 9/0631 713/189 |
| 2015/0222421 A1* | 8/2015 | Guo | G09C 1/00 380/28 |
| 2016/0062920 A1* | 3/2016 | Hars | G06F 12/1408 713/193 |
| 2017/0346622 A1* | 11/2017 | Howard | H04L 9/065 |
| 2018/0062828 A1* | 3/2018 | Cioranesco | H04L 9/002 |

OTHER PUBLICATIONS

PCT International Application No. PCT/KR2017/011040, Notification of Transmittal of the International Search Report and the Written Opinion of the International Searching Authority, or Declaration dated Jan. 17, 2018, 10 pages.

* cited by examiner

[Fig. 1]
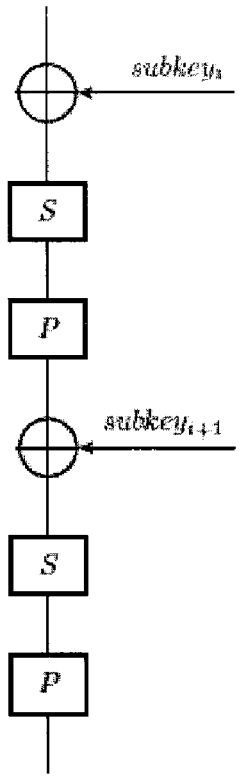
[Fig. 2]
$$B = \begin{bmatrix} 00 & 01 & 02 & 03 & 04 & 05 & 06 & 07 & 08 & 09 & 10 & 11 & 12 & 13 & 14 & 15 \\ 16 & 17 & 18 & 19 & 20 & 21 & 22 & 23 & 24 & 25 & 26 & 27 & 28 & 29 & 30 & 31 \\ 32 & 33 & 34 & 35 & 36 & 37 & 38 & 39 & 40 & 41 & 42 & 43 & 44 & 45 & 46 & 47 \\ 48 & 49 & 50 & 51 & 52 & 53 & 54 & 55 & 56 & 57 & 58 & 59 & 60 & 61 & 62 & 63 \end{bmatrix}$$
$$P(B) = \begin{bmatrix} 00 & 04 & 08 & 12 & 16 & 20 & 24 & 28 & 32 & 36 & 40 & 44 & 48 & 52 & 56 & 60 \\ 01 & 05 & 09 & 13 & 17 & 21 & 25 & 29 & 33 & 37 & 41 & 45 & 49 & 53 & 57 & 61 \\ 02 & 06 & 10 & 14 & 18 & 22 & 26 & 30 & 34 & 38 & 42 & 46 & 50 & 54 & 58 & 62 \\ 03 & 07 & 11 & 15 & 19 & 23 & 27 & 31 & 35 & 39 & 43 & 47 & 51 & 55 & 59 & 63 \end{bmatrix}$$

[Fig. 3]
> Input: A 64-bit block of plaintext $B$, a key $K$.
> Output: A 64-bit block of ciphertext $C$.
> 1: $subkey = (subkey_1, subkey_2, ..., subkey_{32}) \leftarrow keySchedule(K)$
> 2: $C \leftarrow B$
> 3: for $i = 1$ to 31 do
> 4:      $C \leftarrow C \oplus subkey_i$
> 5:      $C \leftarrow S(C)$
> 6:      $C \leftarrow P(C)$
> 7: end for
> 8: $C \leftarrow C \oplus subkey_{32}$
> 9: return $C$
[Fig. 4]
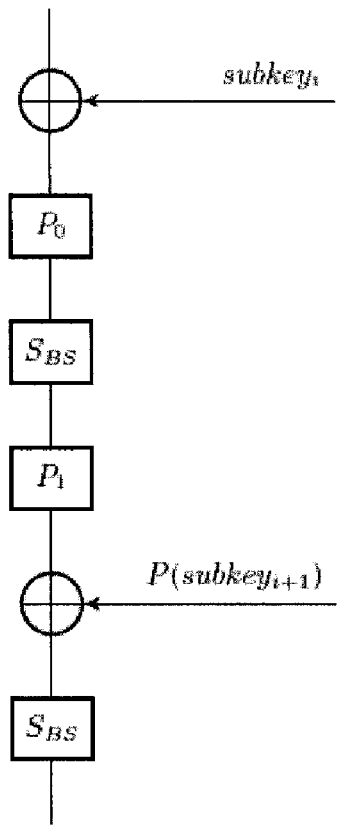

[Fig. 5]

$$B = \begin{bmatrix} 00 & 01 & 02 & 03 & 04 & 05 & 06 & 07 & 08 & 09 & 10 & 11 & 12 & 13 & 14 & 15 \\ 16 & 17 & 18 & 19 & 20 & 21 & 22 & 23 & 24 & 25 & 26 & 27 & 28 & 29 & 30 & 31 \\ 32 & 33 & 34 & 35 & 36 & 37 & 38 & 39 & 40 & 41 & 42 & 43 & 44 & 45 & 46 & 47 \\ 48 & 49 & 50 & 51 & 52 & 53 & 54 & 55 & 56 & 57 & 58 & 59 & 60 & 61 & 62 & 63 \end{bmatrix}$$

$$P_0(B) = \begin{bmatrix} 00 & 16 & 32 & 48 & 04 & 20 & 36 & 52 & 08 & 24 & 40 & 56 & 12 & 28 & 44 & 60 \\ 01 & 17 & 33 & 49 & 05 & 21 & 37 & 53 & 09 & 25 & 41 & 57 & 13 & 29 & 45 & 61 \\ 02 & 18 & 34 & 50 & 06 & 22 & 38 & 54 & 10 & 26 & 42 & 58 & 14 & 30 & 46 & 62 \\ 03 & 19 & 35 & 51 & 07 & 23 & 39 & 55 & 11 & 27 & 43 & 59 & 15 & 31 & 47 & 63 \end{bmatrix}$$

$$P_1(B) = \begin{bmatrix} 00 & 01 & 02 & 03 & 16 & 17 & 18 & 19 & 32 & 33 & 34 & 35 & 48 & 49 & 50 & 51 \\ 04 & 05 & 06 & 07 & 20 & 21 & 22 & 23 & 36 & 37 & 38 & 39 & 52 & 53 & 54 & 55 \\ 08 & 09 & 10 & 11 & 24 & 25 & 26 & 27 & 40 & 41 & 42 & 43 & 56 & 57 & 58 & 59 \\ 12 & 13 & 14 & 15 & 28 & 29 & 30 & 31 & 44 & 45 & 46 & 47 & 60 & 61 & 62 & 63 \end{bmatrix}$$

[Fig. 6]

```
#define PRESENT_PERMUTATION_P0(X0,X1,X2,X3) \
    t = (X0^(X1>>1)) & 0x55555555;           \
    X0 = X0^t; X1 = X1^(t<<1);               \
    t = (X2^(X3>>1)) & 0x55555555;           \
    X2 = X2^t; X3 = X3^(t<<1);               \
    t = (X0^(X2>>2)) & 0x33333333;           \
    X0 = X0^t; X2 = X2^(t<<2);               \
    t = (X1^(X3>>2)) & 0x33333333;           \
    X1 = X1^t; X3 = X3^(t<<2);               \ define PRESENT_PERMUTATION_P1(X0,X1,X2,X3) \
    t = (X0^(X1>>4)) & 0x0F0F0F0F;           \
    X0 = X0^t; X1 = X1^(t<<4);               \
    t = (X2^(X3>>4)) & 0x0F0F0F0F;           \
    X2 = X2^t; X3 = X3^(t<<4);               \
    t = (X0^(X2>>8)) & 0x00FF00FF;           \
    X0 = X0^t; X2 = X2^(t<<8);               \
    t = (X1^(X3>>8)) & 0x00FF00FF;           \
    X1 = X1^t; X3 = X3^(t<<8);               \
```

[Fig. 7]

Input: A 64-bit block of plaintext $B$, a key $K$.
    Output: A 64-bit block of ciphertext $C$.
1: $subkey = (subkey_1, subkey_2, ..., subkey_{32}) \leftarrow keySchedule(K)$
2: $C \leftarrow B$
3: for $i = 1$ to 15 do
4:      $C \leftarrow C \oplus subkey_{2i-1}$
5:      $C \leftarrow P_0(C)$
6:      $C \leftarrow S_{BS}(C)$
7:      $C \leftarrow P_1(C)$
8:      $C \leftarrow C \oplus P(subkey_{2i})$
9:      $C \leftarrow S_{BS}(C)$
10: end for
11: $C \leftarrow C \oplus subkey_{31}$
12: $C \leftarrow P(C)$
13: $C \leftarrow S_{BS}(C)$
14: $C \leftarrow C \oplus subkey_{32}$
15: return $C$

[Fig. 8]

Input: A 64-bit block of ciphertext $C$, a key $K$.
    Output: A 64-bit block of plaintext $B$.
1: $subkey = (subkey_1, subkey_2, ..., subkey_{32}) \leftarrow keySchedule(K)$
2: $B \leftarrow C$
3: $B \leftarrow B \oplus subkey_{32}$
4: $B \leftarrow S_{BS}^{-1}(B)$
5: $B \leftarrow P^{-1}(B)$
6: $B \leftarrow B \oplus subkey_{31}$
7: for $i = 15$ to 1 do
8:      $B \leftarrow S_{BS}^{-1}(B)$
9:      $B \leftarrow B \oplus subkey_{2i}$
10:      $B \leftarrow P_1(B)$
11:      $B \leftarrow S_{BS}^{-1}(B)$
12:      $B \leftarrow P_0(B)$
13:      $B \leftarrow B \oplus P(subkey_{2i-1})$
14: end for
15: return $B$

[Fig. 9]

Performance results for Scenario 1 — key schedule, encryption and decryption of 128 bytes in CBC mode — of side-channel resistant implementations of PRESENT, encompassing both isochronous (constant time) and second-order masking countermeasures.

| Processor | Code size [bytes] | Key schedule [cycles] | Encryption [cycles] | Decryption [cycles] |
|---|---|---|---|---|
| Isochronous implementation | | | | |
| Cortex-M0+ | 1436 | 6381 | 46429 | 23445 |
| Cortex-M3 | 1320 | 5043 | 29442 | 16291 |
| Cortex-M4 | 1328 | 3464 | 22993 | 11731 |
| Cortex-A7 | 2732 | 3232 | 21027 | 10657 |
| Cortex-A15 | 1792 | 1740 | 14780 | 7050 |
| Cortex-A53 | 2484 | 1554 | 13583 | 3726 |
| Masked implementation | | | | |
| Cortex-M0+ | 8056 | 7145 | 332079 | 204690 |
| Cortex-M3 | 7048 | 4628 | 197601 | 122521 |
| Cortex-M4 | 9216 | 3413 | 186556 | 100417 |
| Cortex-A7 | 9248 | 2657 | 116004 | 64041 |
| Cortex-A15 | 9248 | 1894 | 59474 | 29130 |
| Cortex-A53 | 8452 | 1943 | 39983 | 12848 |

[Fig. 10]

Performance results for Scenario 2 — encryption of 128 bits in CTR mode – of side-channel resistant implementations of PRESENT, encompassing both isochronous (constant time) and second-order masking countermeasures.

| Processor | Code size [bytes] | Execution time [cycles] |
|---|---|---|
| Isochronous implementation | | |
| Cortex-M0+ | 2524 | 3183 |
| Cortex-M3 | 2476 | 2116 |
| Cortex-M4 | 2612 | 1599 |
| Cortex-A7 | 2456 | 1708 |
| Cortex-A15 | 2456 | 960 |
| Cortex-A53 | 2536 | 1052 |
| Masked implementation | | |
| Cortex-M0+ | 12392 | 21744 |
| Cortex-M3 | 9728 | 12387 |
| Cortex-M4 | 11012 | 11096 |
| Cortex-A7 | 13322 | 7482 |
| Cortex-A15 | 13322 | 3688 |
| Cortex-A53 | 18028 | 3681 |

[Fig. 11]

Performance results for isochronous execution of the key schedule, encryption and decryption of 128 bytes of data in CTR mode, using both serial and vectorized code.

| Processor | Code size [bytes] | Key schedule [cycles] | Encryption+Decryption [cycles] |
|---|---|---|---|
| Serial implementation | | | |
| Cortex-M0+ | 2524 | 6381 | 47884 |
| Cortex-M3 | 2476 | 5043 | 31830 |
| Cortex-M4 | 2612 | 3464 | 26785 |
| Cortex-A7 | 2456 | 2732 | 27161 |
| Cortex-A15 | 2456 | 1740 | 14169 |
| Cortex-A53 | 2536 | 1554 | 7406 |
| Vector implementation using NEON | | | |
| Cortex-A7 | 2798 | 2299 | 14274 |
| Cortex-A15 | 2798 | 1533 | 8083 |
| Cortex-A53 | 3908 | 1552 | 7322 |

[Fig. 12]

Performance results for execution of the key schedule, encryption and decryption of 128 bytes of data in CTR mode, using both serial and vectorized code, protected by second-order masking.

| Processor | Code size [bytes] | Key schedule [cycles] | Encryption+Decryption [cycles] |
|---|---|---|---|
| Serial implementation | | | |
| Cortex-M0+ | 12392 | 7145 | 345619 |
| Cortex-M3 | 9728 | 4628 | 205244 |
| Cortex-M4 | 11012 | 3413 | 192454 |
| Cortex-A7 | 13322 | 2657 | 119542 |
| Cortex-A15 | 13322 | 1894 | 58635 |
| Cortex-A53 | 18028 | 1943 | 23207 |
| Vector implementation using NEON | | | |
| Cortex-A7 | 2798 | 2671 | 76286 |
| Cortex-A15 | 2798 | 1948 | 28633 |
| Cortex-A53 | 3908 | 1941 | 28343 |

[Fig. 13]

Comparison between our results for PRESENT and results from [35] for AES when encrypting 128 bits of data in CTR mode, in constant time.

| Implementation | Code size [bytes] | Execution time [cycles] |
|---|---|---|
| AES on Cortex-M3 | 12120 | 1617 |
| PRESENT on Cortex-M3 | 2476 | 2116 |
| AES on Cortex-M4 | 12120 | 1618 |
| PRESENT on Cortex-M4 | 2612 | 1599 |

[Fig. 14]
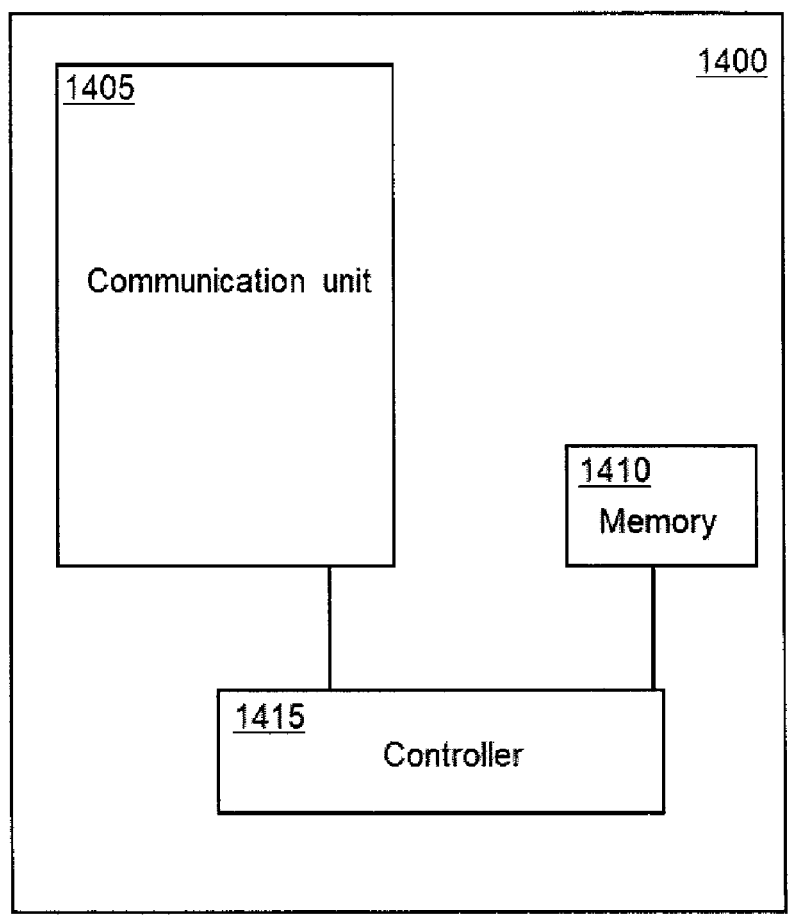

LIGHTWEIGHT BLOCK CIPHER

CROSS-REFERENCE TO RELATED APPLICATIONS

This application is the National Stage filing under 35 U.S.C. 371 of International Application No. PCT/KR2017/011040, filed on Sep. 29, 2017, which claims the benefit of U.S. Provisional Application No. 62/405,975, filed on Oct. 9, 2016, the contents of which are all hereby incorporated by reference herein in their entirety.

TECHNICAL FIELD

Embodiments of the present invention generally relate to a lightweight block cipher, and in particular, to a high-performance block cipher capable of efficient and secure implementation in software.

BACKGROUND ART

The need for secure and efficient implementations of cryptography for embedded systems has been an active area of research since at least the birth of public-key cryptography. While considerable progress has been made, with the development of many cryptographic engineering techniques for optimizing and protecting implementations of both symmetric and asymmetric algorithms, the emergence of new technologies and computing environments such as the Internet of Things (IoT) brings new challenges. The concept assumes an extraordinary amount of devices connected to the Internet and among themselves in local networks. Devices range from simple radio-frequency identification (RFID) tags to complex gadgets like smartwatches, home appliances and smartphones; and fulfill a wide variety of roles, from the automation of simple processes to critical tasks such as traffic control and environmental surveillance.

One example of a cryptography method is the PRESENT block cipher. The PRESENT block cipher was one of the first hardware oriented proposals for implementation in extremely resource-constrained environments. Its design is based on 4-bit S-boxes and a 64-bit permutation, a far from optimal choice to achieve good performance in software. As a result, most software implementations require large lookup tables in order to meet efficiency goals. However the PRESENT block cipher is susceptible to security attacks in both hardware and software implementations due to side-channel leakage. Specifically, side-channel attacks are crafted based on information obtained from the physical implementation of a cryptographic primitive. For instance, an attacker may gather data such as execution time of an algorithm, power consumption, sound produced by the hardware, or even magnetic radiation emitted during the computation, and through these data, the attacker may gain access to sensitive information processed by the device under analysis. Even where an encryption method such as a block cipher is implemented via software, most implementations utilize lookup tables and thus are vulnerable in other ways, such as against timing attacks in processors equipped with cache memory or attacks focusing on conditional branches depending on secret data.

Disclosure of Invention Technical Problem

Accordingly, new solutions are required for secure and efficient implementations of cryptography for embedded systems.

Solution to Problem

In accordance with an embodiment, a cryptographic method for encrypting data with a provided key includes generating a plurality of round keys based on the provided key, processing the data in a block cipher process having a plurality of rounds, each round comprising: performing a first logical combination of the data with a first key of a next two keys of the plurality of keys, first permuting the first logically combined data based on a first defined permutation, performing a first substitution on the first permuted data, second permuting the first substituted data based on a second defined permutation, performing a second logical combination of the second permuted data with a permuted second key of the next two keys, wherein the second key is permuted based on a primary defined permutation, and performing a second substitution on the second logically combined data, wherein after a final round of the plurality of rounds, the method further comprises performing a penultimate logical combination of the second substituted data with a penultimate key of the plurality of keys, permuting the penultimate logically combined data based on the primary defined permutation, performing a final substitution of the permuted data, and performing a final logical combination of the final substituted data with a last key of the plurality of keys.

In accordance with another embodiment, a machine-readable non-transitory medium having stored thereon machine-executable instructions for encrypting data with a provided key includes instructions for generating a plurality of round keys based on the provided key, processing the data in a block cipher process having a plurality of rounds, each round comprising: performing a first logical combination of the data with a first key of a next two keys of the plurality of keys, first permuting the first logically combined data based on a first defined permutation, performing a first substitution on the first permuted data, second permuting the first substituted data based on a second defined permutation, performing a second logical combination of the second permuted data with a permuted second key of the next two keys, wherein the second key is permuted based on a primary defined permutation, and performing a second substitution on the second logically combined data, wherein the machine-executable instructions further include, after a final round of the plurality of rounds, performing a penultimate logical combination of the second substituted data with a penultimate key of the plurality of keys, permuting the penultimate logically combined data based on the primary defined permutation, performing a final substitution of the permuted data, and performing a final logical combination of the final substituted data with a last key of the plurality of keys.

In accordance with another embodiment, an apparatus for encrypting data with a provided key includes a hardware memory configured to store machine-executable instructions for encrypting data with a provided key, and one or more controllers operatively coupled to the memory and configured to generate a plurality of round keys based on the provided key, process the data in a block cipher process having a plurality of rounds, each round comprising: perform a first logical combination of the data with a first key of a next two keys of the plurality of keys, first permute the first logically combined data based on a first defined permutation, perform a first substitution on the first permuted data, second permute the first substituted data based on a second defined permutation, perform a second logical combination of the second permuted data with a permuted second key of the next two keys, wherein the second key is permuted based on a primary defined permutation, and perform a second substitution on the second logically combined data, wherein after a final round of the plurality of rounds, the controller is further configured to perform a penultimate logical combination of the second substituted data with a penultimate key of the plurality of keys, permute the penultimate logically combined data based on the primary defined permutation, perform a final substitution of the permuted data, perform a final logical combination of the final substituted data with a last key of the plurality of keys, and output a result as the encrypted data.

In accordance with another embodiment, an apparatus for encrypting data with a provided key may include means for generating a plurality of round keys based on the provided key, means for processing the data in a block cipher process having a plurality of rounds, each round comprising: performing a first logical combination of the data with a first key of a next two keys of the plurality of keys, first permuting the first logically combined data based on a first defined permutation, performing a first substitution on the first permuted data, second permuting the first substituted data based on a second defined permutation, performing a second logical combination of the second permuted data with a permuted second key of the next two keys, wherein the second key is permuted based on a primary defined permutation, and performing a second substitution on the second logically combined data, wherein the apparatus may further comprise means for, after a final round of the plurality of rounds, performing a penultimate logical combination of the second substituted data with a penultimate key of the plurality of keys, permuting the penultimate logically combined data based on the primary defined permutation, performing a final substitution of the permuted data, and performing a final logical combination of the final substituted data with a last key of the plurality of keys.

These and other embodiments will also become readily apparent to those skilled in the art from the following detailed description of the embodiments having reference to the attached figures, the invention not being limited to any particular embodiment disclosed.

Advantageous Effects of Invention

One embodiment of the present invention affects encrypting data.

BRIEF DESCRIPTION OF DRAWINGS

The above and other aspects, features, and advantages of the present invention will become more apparent upon consideration of the following description of preferred embodiments, taken in conjunction with the accompanying drawing figures.

FIGS. 1, 2, and 3 are illustrations of an encryption method of the existing art.

FIG. 4 is an illustration of an encryption method of an embodiment of the present disclosure.

FIGS. 5 and 6 are illustrations of permutation representations utilized by an encryption method of an embodiment of the present disclosure.

FIG. 7 is another illustration of an encryption method of an embodiment of the present disclosure.

FIG. 8 is an illustration of a decryption method of an embodiment of the present disclosure.

FIG. 9 is a table showing performance results for encryption methods for a first test scenario.

FIG. 10 is a table showing performance results for encryption methods for a second test scenario.

FIGS. 11, 12, and 13 are tables showing performance results for encryption methods for various test scenarios.

FIG. 14 is a block diagram of a device in accordance with embodiments of the present disclosure.

BEST MODE FOR CARRYING OUT THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

The PRESENT block cipher was one of the first hardware oriented proposals for implementation in extremely resource-constrained environments. The PRESENT block cipher is a substitution-permutation network (SPN) that encrypts a 64-bit block using a key with 80 or 128 bits. The two versions of the PRESENT block cipher differ only by the key schedule being one of its main design goals to optimize the hardware implementation.

In the PRESENT block cipher, the key is first processed by the key schedule to generate 32 round keys (subkey$_1$, subkey$_2$, ..., subkey$_{32}$) with 64 bits each. Then, to encrypt a given block of data, it repeats 31 rounds of the following: the block is logically combined with the corresponding round key with an exclusive OR operation (XOR); each contiguous set of 4 bits in the block is substituted according to a substitution box (S-box), S; and then the 64 bits are rearranged by a defined permutation, P. After the final round, the block is XORed with final subkey$_{32}$. A high-level illustration of two consecutive rounds of the PRESENT block cipher encryption is depicted in FIG. 1. In FIG. 1, S represents the substitution box layer and P represents the permutation layer.

With regard to the S-box, S is a 4-bit to 4-bit substitution box which acts over every 4 contiguous bits of the block, as specified in Table 1 below.

TABLE 1

The PRESENT S-box (hexadecimal notation)

| | x | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | A | B | C | D | E | F |
| S [x] | C | 5 | 6 | B | 9 | 0 | A | D | 3 | E | F | 8 | 4 | 7 | 1 | 2 |

According to With regard to the permutation layer P of the PRESENT block cipher, the bit permutation is defined and specified in Table 2 below, which is utilized as a lookup table in implementations of the PRESENT block cipher.

TABLE 2

The PRESENT bit permutation (P).

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| P(i) | 0 | 16 | 32 | 48 | 1 | 17 | 33 | 49 | 2 | 18 | 34 | 50 | 3 | 19 | 35 | 51 |

| i | 16 | 17 | 18 | 19 | 20 | 21 | 22 | 23 | 24 | 25 | 26 | 27 | 28 | 29 | 30 | 31 |
|---|----|----|----|----|----|----|----|----|----|----|----|----|----|----|----|----|
| P(i) | 4 | 20 | 36 | 52 | 5 | 21 | 37 | 53 | 6 | 22 | 38 | 54 | 7 | 23 | 39 | 55 |

| i | 32 | 33 | 34 | 35 | 36 | 37 | 38 | 39 | 40 | 41 | 42 | 43 | 44 | 45 | 46 | 47 |
|---|----|----|----|----|----|----|----|----|----|----|----|----|----|----|----|----|
| P(i) | 8 | 24 | 40 | 56 | 9 | 25 | 41 | 57 | 10 | 26 | 42 | 58 | 11 | 27 | 43 | 59 |

| i | 48 | 49 | 50 | 51 | 52 | 53 | 54 | 55 | 56 | 57 | 58 | 59 | 60 | 61 | 62 | 63 |
|---|----|----|----|----|----|----|----|----|----|----|----|----|----|----|----|----|
| P(i) | 12 | 28 | 11 | 60 | 13 | 29 | 15 | 61 | 11 | 30 | 16 | 62 | 15 | 31 | 17 | 63 |

The permutation P may also be represented by Equation 1 below where the i-th bit of the state is moved to the position P(i):

$$P(i) = \begin{cases} 16i \bmod 63, & \text{if } i \neq 63. \\ 63, & \text{if } i = 63. \end{cases} \quad \text{Equation 1}$$

From the definition of P, it is observable that $P^2 = P^{-1}$. Further, as shown in FIG. 2, given a 64-bit data block B stored in four 16-bit registers, the application of the PRESENT block cipher's permutation P aligns the state in a way that the concatenation of the i-th bit of each of the four registers of the permuted state corresponds to four consecutive bits of the original state, B.

The PRESENT block cipher may thus be represented as the algorithm shown in FIG. 3. The PRESENT block cipher algorithm includes generating 32 round keys (subkey$_1$, subkey$_2$, ..., subkey$_{32}$) with 64 bits each based on key, K. The algorithm further includes 31 rounds each including an exclusive OR operation to introduce a round key $K_i$, where $1 \leq i \leq 31$, the non-linear substitution layer S, defined above in Table 1, and the linear bitwise permutation P defined above in Table 2. The state of the ciphertext following the 31 rounds is XORed with final round key $K_{32}$ to conclude the algorithm and produce the final ciphertext. As discussed, while the PRESENT block cipher provides a substitution permutation block cipher method, it is vulnerable to side channel attacks as it is reliant on specific hardware implementations and stored table lookups.

Referring now to FIGS. 4-7, an improved lightweight block cipher according to embodiments of the present disclosure is depicted. Embodiments of the present disclosure include portable and efficient lightweight block ciphers, capable of efficient and constant time implementation in software thus being protected against side channel timing attacks. Embodiments of the present disclosure use decomposition components of the permutation layer P (discussed in FIG. 2), and a bitsliced computation of the S-box S (shown in Table 1) using optimized Boolean formulas which do not require stored lookup tables. Thus, the reliance on hardware implementations and specific vulnerabilities to side channel attacks are reduced by the present disclosure.

For example, in FIG. 4, two rounds of a lightweight block cipher encryption according to an embodiment of the present disclosure are shown. Subkey$_i$ and subkey$_{i+1}$ represent round keys generated by the key schedule using key K and are generated similarly to the subkeys discussed above with respect to FIG. 1. $S_{BS}$ represents the substitution box layer as discussed above in FIG. 1, but its implementation is modified in the present embodiments to take as input state bits whose indexes are congruent modulo 16 instead of every four consecutive bits. In other words, the $S_{BS}$ S-box of FIG. 4 interprets the state of the cipher as four 16-bit words and operates on them in a bitsliced fashion. Thus, S of FIG. 1 and $S_{BS}$ of FIG. 4 result in equivalent substitutions, even though $S_{BS}$ is far more efficient than S, allowing for calculation of sixteen S-box applications simultaneously.

$P_0$ and $P_1$ of FIG. 4 represent permutation layers which are modified components of the permutation layer P as discussed in FIG. 1. Specifically, every two applications of permutation P are replaced by evaluations of permutations $P_0$ and $P_1$ within one round of the block cipher, as shown in the embodiment of FIG. 4. In other words, the combined application of $P_0$ and $P_1$ in a single round of the cipher comprising two subkey operations as shown in FIG. 4 is equivalent to two implementations of the permutation layer P over two rounds, as shown in FIG. 1. Thus, in the embodiment of FIG. 4, permutations $P_0$ and $P_1$ satisfy the property $P_1 \cdot P_0 = P^2$.

FIG. 5 shows matrix representations of the 64-bit input block B (the same input block B in FIG. 2) and its permutations $P_0(B)$ and $P_1(B)$, all of them divided into four 16-bit rows. If the ciphertext is stored into four 16-bit registers, it is shown in FIG. 5 that both $P_0$ and $P_1$ organize the state in such a way that every four consecutive bits are aligned in columns throughout those four registers, similar to a fully bitsliced implementation. Therefore, the embodiment depicted in FIG. 4 can make use of bitwise operations to simulate the S-box step without relying on lookup tables, calculating 16 S-box applications simultaneously.

Embodiments of permutations $P_0$ and $P_1$ are further represented in FIG. 6, where $P_0$ and $P_1$ are defined in the C programming language as PRESENT_PERMUTATION_P0 and PRESENT_PERMUTATION_P1, respectively. With respect to the code depicted in FIG. 6, the macros permute two 64-bit blocks simultaneously, using an auxiliary variable t and storing one block on the high 16-bit word of the 32-bit variables X0, X1, X2, and X3, and storing the other block on the low 16-bit word of the same variables X0, X1, X2, and X3.

Based on the above, an embodiment of a method of the present disclosure is depicted in FIG. 7. The embodiment includes generating 32 round keys (subkeys) based on the key, K using a key schedule. Then, to encrypt a given block of plaintext data B, the following steps are repeated over 15 rounds: the block is XORed with a first round key of the next two round keys, the bits are permuted using defined permutation $P_0$ (see FIGS. 5 and 6), a substitution is performed using $S_{BS}$ on four state bits of the block at a time having indexes congruent modulo 16, the bits are permuted using defined permutation $P_1$ (see FIGS. 5 and 6), the block is XORed with a second round key of the next two round keys which is permuted using defined permutation P (see FIG. 2), and another substitution is performed using $S_{BS}$ on four state bits of the block at a time having indexes congruent modulo 16. After 15 rounds of the above steps, the block is XORed with the $31^{st}$ subkey (of 32 subkeys), the block is then permuted using defined permutation P (see FIG. 2), a substitution is performed using $S_{BS}$ on 4 state bits of the block at a time having indexes congruent modulo 16, and finally the block is XORed with the $32^{nd}$ and final subkey to produce the final ciphertext.

In comparing the algorithm of FIG. 7 with the algorithm of FIG. 3, if the S-box operations are disregarded—since the S-boxes S and $S_{BS}$ result in equivalent substitutions—it is observable that given ciphertext X, $P(P(X \oplus subkey_i) \oplus subkey_{i+1}) = P^2 (X \oplus subkey_i) \oplus P(subkey_{i+1}) = P_1(P_0(X \oplus subkey)) \oplus P(subkey_{i+1})$, being that the leftmost term (the transformation undergone by state X over rounds i and i+1 in FIG. 3), and the rightmost term (the transformation undergone by state X over rounds i and i+1, for i odd, in FIG. 7), when the S-box step on both algorithms are disregarded.

While the combined application of $P_0$ and $P_1$ in a single round of a block cipher comprising two subkey operations (for example, in FIG. 7) is equivalent to two implementations of the permutation layer P comprising one subkey operation (for example, in FIG. 3), defined permutations $P_0$ and $P_1$ are more efficient than permutation P, particularly in a software implementation of the block cipher. Applications of permutations $P_0$ and $P_1$, require less operations to be performed when compared to two applications of permutation P, with an estimated cost of 14 clock cycles to execute either $P_0$ and $P_1$ and a cost of 24 cycles to execute a single application of permutation P.

It is also apparent in FIG. 7 that the defined permutation P is still applied to some of the round keys as well as once to the ciphertext after being XORed with $subkey_{31}$. However, since many blocks of messages are encrypted or decrypted with the same key, the key schedule routine has a low impact on performance of the implementation since it is executed only once for several executions of the encryption/decryption routines.

In some embodiments, the encryption scheme of the present disclosure may be implemented in a 32-bit architecture where two blocks of plaintext can be encrypted in integer counter mode (CTR) mode at once, organizing the state such that 32 S-boxes are calculated simultaneously instead of only 16. In other embodiments, the encryption scheme of the preset disclosure is implemented in a 64-bit architecture where four blocks of plaintext can be encrypted using the same strategy. In yet other embodiments, a code size of the implementation of the encryption scheme may be reduced by omitting the implementation of P, given that $P_0$ and $P_1$ are involutory permutations. Specifically, since $P_0 = P_0^{-1}$ and $P_1 = P_1^{-1}$, it follows that $P_1 \cdot P_0 = P_2$ and $P_2 = P^{-1}$, and further $P_0 ? P_1 = P$. Thus, an embodiment is considered where P does not need to be implemented in software provided that $P_0$ and $P_1$ have already been coded.

Referring to FIG. 8, an embodiment of decrypting ciphertext that has been encrypted by the encryption method discussed above in FIG. 7 is depicted. Specifically, the decryption method depicted in FIG. 8 represents the direct inversion of encryption of FIG. 7. This is made possible by the fact that $P_0$ and $P_1$ are involutory permutations as discussed above, that is $P_0 = P_0^{-1}$ and $P_1 = P_1^{-1}$.

Even where a block cipher design is ideally secure, a careless implementation may leak sensitive data during execution and undermine the security of the algorithm with its insecure realization. Particularly, a major concern is side-channel attacks, that is, attacks which are crafted based on information obtained from the physical implementation of a cryptographic primitive. For instance, an attacker may gather data such as execution time of an algorithm, power consumption, sound produced by the hardware, or even magnetic radiation emitted during the computation and, through these data, the attacker may gain access to sensitive information processed by the device under analysis.

While side-channel attacks may be limited to situations where the attacker has physical access to the hardware executing the implementation or at least can interact with the device through the network, it is not completely unreasonable to ignore the possibility of such attacks when the implementation of the algorithm is physically protected from the attacker or not accessible for any kind of interaction. In this scenario, devices are frequently accessible to the attacker by either physical means or through the network and typically lack tamper-resistance countermeasures for protecting the hardware from external influence.

Typically, protecting software implementations from more invasive side-channel attacks may present a challenge, since the software countermeasures can be typically circumvented by an invasive attacker. The main sources of timing vulnerabilities may be memory accesses and conditional branches depending on secret data. Conditional branching, by definition, may cause different instructions to be executed among different runs of a program, which, by its turn, may cause the execution time of the algorithm to depend on sensitive data given as input. The effect of branch misprediction in more sophisticated processors may further interfere with pipelined datapaths and provoke significant variations. In a similar way, if a processor is equipped with cache memory, the execution time may leak information about the rate of cache misses or hits during memory accesses, and if these accesses depend on sensitive data, this implementation becomes susceptible to side-channel attacks.

Therefore, by avoiding these situations, a distinct advantage of the embodiments of the present disclosure, in particular software implementation of the embodiments, can encrypt a message block in constant time, independently of characteristics about the inputs (plaintext message or cryptographic key). This constant runtime property is referred to as isochronicity.

Ensuring that encryption code runs in constant time may be sufficient to render timing attacks impractical, despite the availability of other side-channel leakages. Another technique for improving side-channel resistance known in the existing art is called secret sharing, or masking, which consists of splitting sensitive variables occurring in the computation into d+1 shares (or masks) in order to unlink the correlation between environmental information and the secret data being processed. A masking technique based on d+1 masks is said to be a d-th order masking and can only be broken by an attacker who manages to obtain leakage related to at least d+1 intermediate variables of the algorithm. It is possible to prove that the difficulty for a side-channel attack to succeed, in practice, increases exponentially with d and, hence, the masking order can be considered a sound criterion to evaluate the robustness of the implementation against side-channel analysis.

Known techniques in the related art present different alternatives to implement a masked encryption algorithm. In one proposal, the masked state of a sensitive variable m with d+1 shares is given by the following:

$$m = \bigoplus_{i=0}^{d} m_i = m_0 \oplus m_1 \oplus \ldots \oplus m_d. \quad \text{Equation 2}$$

where each $m_i$ is a share of the secret and all shares form together a masked secret. In order to create a masked implementation on the variable m, one can randomly generate the d masks $m_1, m_2, \ldots, m_d$ and calculate $m_0$ such that the above Equation 2 holds. From this definition, different operation calculations over the masks may be derived.

A NOT operation over a masked secret has to be carried out as a NOT operation performed on an odd number of masks to preserve the relationship in Equation 2. A single mask can just as well be negated:

$$\neg m = \neg m_0 \oplus m_1 \oplus \ldots \oplus m_d.$$

An XOR operation between masked secrets $$a = \bigoplus_{i=0}^{d} a_i \text{ and } b = \bigoplus_{i=0}^{d} b_i$$

can be performed by calculating the XOR of all corresponding masks:

$$a \oplus b = \bigoplus_{i=0}^{d} (a_i \oplus b_i).$$

An AND operation between two masked secrets is more complicated and can be computed as follows: for every pair $$(i,j), 1 \le i < j \le d+1;$$

generate a random bit $z_{i,j}$. Then, compute $$z_{i,j} = (z_{i,j} \oplus a_i b_j) \oplus a_j b_i.$$

Now, for every $1 \le i \le d+1$, the i-th share may be computed as $$m_i = a_i b_i \oplus \bigoplus_{i \ne j} z_{i,j}.$$

An OR operation might be calculated using the logical identity $$OR(a,b) = \neg(\neg a \cdot \neg b)$$

which depends only on operations previously defined.

The nonlinear operations OR and AND stand out as the most expensive ones, requiring $O(d^2)$ calls to a random bit generator and memory to store a matrix z of $O(d^2)$ entries. This is the main drawback of the technique in resource-constrained devices and makes the use of high-order masking impractical in many scenarios.

Currently, there is a vast variety of processors under consideration for integration to the IoT. The focus for the purposes of this disclosure is on some representatives of the ARM architecture, since it is the world leader in the market of microprocessors and, thus, attracts relevant academic work as well as commercial interest.

The lightweight block cipher embodiments of the present disclosure were benchmarked on the following platforms: Cortex-M0+ (Arduino Zero powered by an Atmel SAMD21G18A ARM Cortex-M0+ CPU, clocked at 48 MHz); Cortex-M3 (Arduino Due powered by an Atmel SAM3X8E ARM Cortex-M3 CPU, clocked at 84 MHz); Cortex-M4 (Teensy 3.2 board containing a MK20DX256VLH7 Cortex-M4 CPU, clocked at 72 MHz); Cortex-A7/A15 (ODROID-XU4 board containing a Samsung Exynos5422 2 GHz Cortex-A15 and Cortex-A7 octa-core CPU); and Cortex-A53 (ODROID-C2 board containing an Amlogic 64-bit ARM 2 GHz Cortex-A53 (ARMv8) quad-core CPU).

Members of the Cortex-M family are commonly used in embedded applications, being found on devices ranging from medical instrumentation equipment to domestic household appliances. The design of these processors is optimized for cost and energy efficiency, making them relatively low-end when compared to the other targets. As for the members of Cortex-A family, they are more computationally powerful than the Cortex-M processors, being able to execute complex tasks such as running a robust operating system or a high-quality multimedia task. These processors have access to the NEON engine, a powerful Single Instruction Multiple Data (SIMD) extension, and may have sophisticated out-of-order execution.

The code size and speed of the implementations of the embodiments of the present disclosure are measured in two scenarios. Scenario 1 simulates a communication protocol established in sensor networks or between IoT devices. It is assumed here that the device possesses the master key stored in RAM, calculates the key schedule and then proceeds to encrypt and decrypt 128 bytes of sensitive data using the CBC mode of operation. Due to the employment of the CBC mode, the suggested trick of encrypting more than one block in parallel does not work, since this mode of operation forces dependencies between consecutive input blocks. Hence, it is noted that this may not be the optimal scenario to use the techniques of the present disclosure, but this was selected to enable direct comparison.

Scenario 2 simulates an authentication protocol in which the block cipher is used to encrypt 128 bits of data in CTR mode of operation. The round keys are assumed to be stored in memory and, consequently, no key schedule is required. This is a very appropriate stance to employ all of the optimizations proposed so far, since the CTR mode encrypts and decrypts blocks of input independently.

Results for both scenarios are depicted in FIGS. 9 and 10. All the measurements were based on code fully written in C language, compiled by GCC 6.1.1 in the case of the Cortex-A family and by GCC 4.8.4 for the Cortex-M family, using the flag –O3 for optimized speed results.

All timings for Cortex-M processors were reproduced to a reasonable degree in the ARM Cortex-M Prototyping System (MPS2), an FPGA-based board with support to microcontrollers ranging from the Cortex-M0 to M7. However, only timings collected in the widely available platforms are considered to simplify comparisons with future competing implementation efforts.

One of the main observations attained from the measurements of FIGS. 9 and 10 is that the cost to protect the implementations with masking is high, especially in lower-end processors. In the case of the embodiments of the present disclosure, a second-order masking was used and the time consumed by the random number generator was disregarded. Still, a slowdown of up to 6.8 times was observed in the case of the Cortex-M0+. For higher-end processors, however, the slowdown can be inferior to a 4-factor. Throughout all processors, a sensible increase in code size due to masking is observed. Another fact to notice is that, as expected, even when differences in input size are taken into account, the performance of the PRESENT block cipher in Scenario 2 is substantially better than the performance in Scenario 1, mainly due to the choice of mode of operation. In Scenario 1, using the CBC mode, only decryption can be parallelized, and encryption ends up being roughly twice as slow as in CTR mode.

For the platforms with access to NEON instructions, parallelism within the PRESENT block cipher encryption algorithm can also be explored for enhancing performance. In particular, it is relevant to mention that the NEON instructions VTBL and VTBX allow the computation of fast table lookups by performing register operations, without the need of memory accesses. Besides the original formulation of the PRESENT algorithm that implements S-boxes as lookup tables, the performance of an alternate method is compared which decomposes the permutation P into two others. However, this decomposition of the alternate method aims to allow a faster lookup table-based implementation, which is the opposite of the implementation of the present disclosure.

NEON implementations can process eight blocks simultaneously due to the support of 128-bit registers, in the same fashion as processing two blocks in parallel in 32-bit processors or four blocks in parallel using 64-bit ones. For this reason, neither Scenario 1 nor Scenario 2 discussed above is appropriate to evaluate vector implementations. Scenario 1 does not support parallelism due to the mode of operation employed and Scenario 2 processes only 128 bits of data, which is only two blocks of input, not making use of the full capacity of processing eight blocks at once. Using the NEON instructions to implement the lookup tables used in the alternate method, the embodiments of the present disclosure are still observed to be faster.

For this reason, the performance of the NEON implementations of the present disclosure was evaluated under a third scenario, in which the key schedule was run, and 128 bytes of data is encrypted and decrypted. These results are shown in FIGS. 11 and 12, alongside with the results of the native implementation, without vector instructions, to provide a baseline for comparison.

By analyzing the results, it is observable that the NEON instructions were able to provide a meaningful speedup for the 32-bit processors. For the 64-bit Cortex-A53, however, the efficiency of native instructions associated with the possibility of processing four blocks in parallel beats the vector implementation by a small margin. Naturally, these implementations have a substantial impact on code size when compared to the results of FIG. 7. Further, the only difference introduced by this third scenario compared to Scenario 1 is the choice of the mode of operation. It further illustrates how much better CTR performs in this case, in which the parallelism intrinsic to the encryption routine is utilized.

Even when comparing the most efficient publicly available implementations of the PRESENT block cipher in similar platforms, reporting an execution time of 16,786 clock cycles and a code size of 3,568 bytes, the results of the implementations according to the present disclosure are almost eight times better considering the execution time, and almost two times better regarding the code size in Scenario 2. With regard to the metrics for Scenario 1, the results for publicly available implementations of the PRESENT block cipher reports usage of 270,603 cycles of execution and 2,528 bytes of code, which is slower and more space-consuming than implementations according to the present disclosure.

In the case of a bitsliced implementation of the PRESENT block cipher on a Cortex-M4, protected by a second-order masking, one input block may be encrypted in 6,532 cycles according to one publicly available reporting. The results of the present disclosure are better, since, even if there is no penalty caused by the tight coupling with a mode of operation, it would encrypt 128 bits of data in 13,064 cycles, which is slower than the 11,096 cycles achieved for the same processor. Furthermore, since this implementation has a bitslice factor of 32, it cannot actually encrypt only 128 bits of data without having to do extra work, whereas implementation of the present disclosure is not only faster, but more flexible in the sense that it allows small amounts of data to be efficiently encrypted. It is also relevant to take into consideration performance results from other block ciphers to gauge how useful the techniques of the present disclosure may be in practice. In particular, the AES block cipher was examined, arguably the most extensively used block cipher today and which has been noted for its performance in software. The current state-of-the-art implementations for AES on Cortex-M processor, compared to results of the present disclosure are shown in FIG. 13, for encrypting 128 bits of data through CTR mode in constant time. It is observable that the present disclosure may not be as efficient on Cortex-M3, but is faster on Cortex-M4 and, on both processors the present disclosure code footprint is several times smaller Accordingly, embodiments discussed herein present substantial performance improvements and advantages implementing the PRESENT block cipher, and additionally provide substantial security improvements and advantages as vulnerabilities to side channel attacks are mitigated.

FIG. 14 is a block diagram of a device or apparatus 1400 in accordance with the present disclosure. In accordance with embodiments of the present invention, the embodiments presented herein may be variously implemented using some or all of the features of device 1400. Examples of such devices include sensors, mobile devices, base stations, cellular phones, smart phones, user equipment, laptop computers, digital broadcast terminals, personal digital assistants (PDAs), portable multimedia players (PMPs), navigators, portable computers (PCs), slate PCs, tablet PCs, ultra-books, wearable devices (for example, smart watches, smart glasses, head mounted displays (HMDs)), and the like. By way of non-limiting example only, description herein is made with reference to particular types of devices. However, such teachings apply equally to other types of devices. In addition, these teachings may also be applied to stationary terminals or devices such as digital TV, desktop computers, and the like. In some embodiments, the lightweight block cipher of the present disclosure is evaluated in embedded ARM CPUs ranging from microcontrollers to full-featured processors equipped with vector instructions.

Device 1400 includes a wireless communication unit 1405, memory 1410, and a controller 1415. FIG. 14 illustrates the device having various components, but it is understood that implementing all of the illustrated components is not a requirement, and that greater or fewer components may alternatively be implemented.

Communication unit 1405 typically includes one or more modules which permit wired or wireless communications between the device 1400 and a communication system or network, between the device and another device, between the device and an external server, and other communications. In some embodiments, communication unit 1405 may transmit/receive wireless signals to/from at least one network entity such as, for example, a base station, an external terminal, a server, and the like, of a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

If desired, communication unit 1405 may alternatively or additionally transmit/receive wireless signals via communication networks according to wireless Internet technologies. Examples of such wireless Internet access include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), Long Term Evolution (LTE), and the like. Other suitable technologies for implementing short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like.

The memory 1410 may store a plurality of application programs (or applications) executed in the device 1400, data for operations of the device 1400, instruction words, and the like. The memory 1410 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the device 1400 may be operated in relation to a web storage device that performs the storage function of the memory 1410 over the Internet or other network.

The controller 1415 may typically control the general operations of the device 1400, along with performing various encryption schemes presented herein. As such, various embodiments described herein may be implemented in a computer-readable medium, a machine-readable medium, or similar medium using, for example, software, hardware, or any combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

Various embodiments of the present invention have been described, but still further features may alternatively or additionally be implemented in accordance with alternative embodiments of the present invention. Although embodiments may be implemented using the exemplary series of operations described herein (e.g., in conjunction with the various flowcharts discussed above), additional or fewer operations may be performed.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

The invention claimed is:

1. A cryptographic method for encrypting data with a provided key, the method comprising:
   generating a plurality of round keys based on the provided key;
   processing the data in a block cipher process having a plurality of rounds, each round comprising:
   performing a first logical combination of the data with a first key of a next two keys of the plurality of keys;
   first permuting the first logically combined data based on a first defined permutation;
   performing a first substitution on the first permuted data;
   second permuting the first substituted data based on a second defined permutation;
   performing a second logical combination of the second permuted data with a permuted second key of the next two keys, wherein the permuted second key is permuted based on a primary defined permutation; and
   performing a second substitution on the second logically combined data,
   wherein after a final round of the plurality of rounds, the method further comprises performing a penultimate logical combination of the second substituted data with a penultimate key of the plurality of keys, permuting the penultimate logically combined data based on the primary defined permutation, performing a final substitution of the permuted data, and performing a final logical combination of the final substituted data with a last key of the plurality of keys.

2. The method of claim 1, wherein a result of a block of data permuted based on the primary defined permutation is equal to a result of permuting based on the first defined permutation, a permutation result of the same block of data based on the second defined permutation.

3. The method of claim 2, wherein the primary defined permutation, is specified by the following equation:

$$P(i) = \begin{cases} 16i \bmod 63. & \text{if } i \ne 63. \\ 63. & \text{if } i = 63. \end{cases}$$

4. The method of claim 1, wherein the first, second, and final substitutions are performed using a substitution box which operates on 4-bit sets of an input, wherein each of the 4-bit sets comprises four state bits of the input having indexes within the input which are congruent modulo 16.

5. The method of claim 4, wherein the substitution box is performed using Boolean operations.

6. The method of claim 4, wherein the substitution box is performed using no table lookups.

7. The method of claim 1, wherein the provided key is 80 bits or 128 bits in length.

8. The method of claim 1, wherein each of the performing of the first, second, penultimate, and final logical combinations corresponds to performing an exclusive OR operation.

9. A machine-readable non-transitory medium having stored thereon machine-executable instructions for encrypting data with a provided key, the machine-executable instructions for:
   generating a plurality of round keys based on the provided key;
   processing the data in a block cipher process having a plurality of rounds, each round comprising:
   performing a first logical combination of the data with a first key of a next two keys of the plurality of keys;
   first permuting the first logically combined data based on a first defined permutation;
   performing a first substitution on the first permuted data;
   second permuting the first substituted data based on a second defined permutation;
   performing a second logical combination of the second permuted data with a permuted second key of the next two keys, wherein the second key is permuted based on a primary defined permutation; and
   performing a second substitution on the second logically combined data,
   wherein the machine-executable instructions further comprise, after a final round of the plurality of rounds, performing a penultimate logical combination of the second substituted data with a penultimate key of the plurality of keys, permuting the penultimate logically combined data based on the primary defined permutation, performing a final substitution of the permuted data, and performing a final logical combination of the final substituted data with a last key of the plurality of keys.

10. The machine-readable non-transitory medium of claim 9, wherein a result of a block of data permuted based on the primary defined permutation is equal to a result of permuting based on the first defined permutation, a permutation result of the same block of data based on the second defined permutation.

11. The machine-readable non-transitory medium of claim 10, wherein the primary defined permutation P, is specified by the following equation:

$$P(i) = \begin{cases} 16i \bmod 63. & \text{if } i \ne 63. \\ 63. & \text{if } i = 63. \end{cases}$$

12. The machine-readable non-transitory medium of claim 9, wherein the first, second, and final substitutions are performed using a substitution box which operates on 4-bit sets of an input, wherein each of the 4-bit sets comprises four state bits of the input having indexes within the input which are congruent modulo 16.

13. The machine-readable non-transitory medium of claim 12, wherein the substitution box is performed using Boolean operations.

14. The machine-readable non-transitory medium of claim 12, wherein the substitution box is performed using no table lookups.

15. The machine-readable non-transitory medium of claim 9, wherein the provided key is 80 bits or 128 bits in length.

16. The machine-readable non-transitory medium of claim 9, wherein each of the performing of the first, second, penultimate, and final logical combinations corresponds to performing an exclusive OR operation.

17. An apparatus comprising:
   a hardware memory configured to store machine-executable instructions for encrypting data with a provided key; and
   one or more controllers operatively coupled to the memory and configured to:
   generate a plurality of round keys based on the provided key;
   process the data in a block cipher process having a plurality of rounds, each round comprising:
   perform a first logical combination of the data with a first key of a next two keys of the plurality of keys;
   first permute the first logically combined data based on a first defined permutation;
   perform a first substitution on the first permuted data;
   second permute the first substituted data based on a second defined permutation;
   perform a second logical combination of the second permuted data with a permuted second key of the next two keys, wherein the second key is permuted based on a primary defined permutation; and
   perform a second substitution on the second logically combined data, wherein after a final round of the plurality of rounds, the controller is further configured to perform a penultimate logical combination of the second substituted data with a penultimate key of the plurality of keys, permute the penultimate logically combined data based on the primary defined permutation, perform a final substitution of the permuted data, perform a final logical combination of the final substituted data with a last key of the plurality of keys, and output a result as the encrypted data.

18. The apparatus of claim 17, wherein a result of a block of data permuted based on the primary defined permutation is equal to a result of permuting based on the first defined permutation, a permutation result of the same block of data based on the second defined permutation.

19. The apparatus of claim 18, wherein the primary defined permutation P, is specified by the following equation:

$$P(i) = \begin{cases} 16i \bmod 63. & \text{if } i \ne 63. \\ 63. & \text{if } i = 63. \end{cases}$$

20. The apparatus of claim 17, wherein the first, second, and final substitutions are performed using a substitution box which operates on 4-bit sets of an input, wherein each of the 4-bit sets comprises four state bits of the input having indexes within the input which are congruent modulo 16.

21. The apparatus of claim 17, wherein each of the performing of the first, second, penultimate, and final logical combinations corresponds to performing an exclusive OR operation.

\* \* \* \* \*